United States Patent [19]

Sauer et al.

[11] Patent Number: 4,786,085
[45] Date of Patent: Nov. 22, 1988

[54] COUPLING DEVICE FOR TUBULAR MEMBERS

[75] Inventors: Heinz Sauer, Ronneburg; Wilfried Heise, Bad Nauheim, both of Fed. Rep. of Germany

[73] Assignee: Rasmussen GmbH, Maintal, Fed. Rep. of Germany

[21] Appl. No.: 146,730

[22] Filed: Jan. 21, 1988

[30] Foreign Application Priority Data

Jan. 27, 1987 [DE] Fed. Rep. of Germany ....... 3702246

[51] Int. Cl.$^4$ .................... F16L 35/00; F16L 37/12
[52] U.S. Cl. ...................................... 285/24; 285/307; 285/319; 285/423; 285/915; 285/921
[58] Field of Search .................... 285/319, 320, 5, 24, 285/27, 921, 307, 423, 915

[56] References Cited

U.S. PATENT DOCUMENTS

| | | | |
|---|---|---|---|
| 2,684,256 | 7/1954 | Krukowski | 285/320 X |
| 3,588,149 | 6/1971 | Demler | 285/307 X |
| 4,214,779 | 7/1980 | Losell | 285/319 X |
| 4,708,375 | 11/1987 | Sauer | 285/319 X |
| 4,735,440 | 4/1988 | Sauer | 285/319 X |

Primary Examiner—Dave W. Arola
Attorney, Agent, or Firm—Peter K. Kontler

[57] ABSTRACT

A coupling device between a hose and the radiator of a motor vehicle has a nipple on the radiator with a circumferentially complete rib at its front end. The front flank of the rib is conical and the rear flank of the rib extends radially of the nipple and is adjacent a groove with three equidistant axially parallel ramps one of which is in line with a bridge extending forwardly of the conical flank. The end of the hose is attached to a coupling element with three equidistant prongs each having a radially inwardly extending claw at its front end. The claws slide along the conical flank of the rib when the front end of the coupling element is inserted into the front end of the nipple, and the claws ultimately enter into and are held in the groove. Each claw has two mutually inclined cam faces, the same as the bridge. If a claw hits the bridge during attachment of the coupling element to the nipple, the cam faces of the bridge and the cam faces of the abutting claw cooperate to turn the coupling element relative to the nipple so as to ensure that each claw can slide along the conical front flank of the rib on its way into the groove. The ramps have top lands between pairs of concave surfaces in the groove. In order to separate the coupling element from the nipple, the coupling element is turned so that the claws slide along the concave surfaces and reach the top lands of the ramps; such top lands are at the level of the radially outermost portion of the rib so that the coupling element can be pulled away from the nipple.

14 Claims, 1 Drawing Sheet

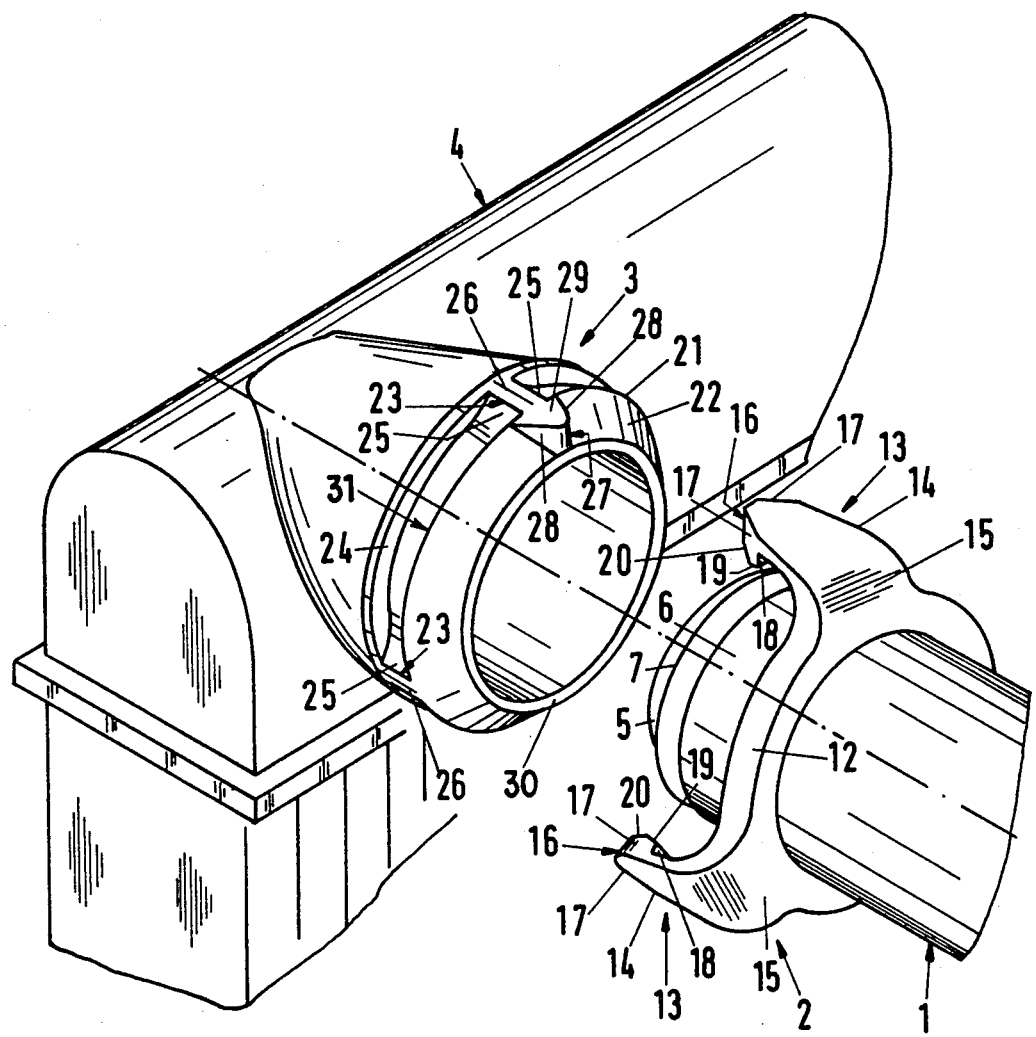

COUPLING DEVICE FOR TUBULAR MEMBERS

BACKGROUND OF THE INVENTION

The invention relates to coupling devices in general, and more particularly to improvements in devices for sealingly and separably coupling a first tubular member to a second tubular member, for example, for sealingly and separably connecting one end of a flexible hose to a fluid-conveying and/or confining part of a radiator in a motor vehicle.

U.S. Pat. No. 3,588,149 discloses a vacuum or pressure coupling device wherein a first coupling element with several claws can engage a second coupling element only when the two coupling elements assume predetermined angular positions relative to each other (a similar coupling device is disclosed in U.S. Pat. No. 2,684,256). The reason is that the claws must be moved behind a substantially radially extending rear flank of a rib on the second coupling element, and this can take place only when the claws are free to move first through axially extending gaps or slots between arcuate sections of the rib. The front flank of the rib extends radially of the second coupling element so that it cannot initiate a spreading apart of the claws such as would be necessary in order to guide the claws toward engagement with the rear flank of the rib. Therefore, the patented coupling devices cannot be manipulated by robots in automatic assembly plants (e.g., in automobile assembling plants) because a robot could attach the two coupling elements to each other only when the claws of the second coupling element would register with the slots of the rib on the second coupling element.

OBJECTS AND SUMMARY OF THE INVENTION

An object of the invention is to provide a coupling device which is constructed and assembled in such a way that its coupling elements can be automatically attached to each other irrespective to their angular positions.

Another object of the invention is to provide a coupling device wherein the retaining rib on one of the coupling elements need not be slotted for the purposes of permitting its engagement with the claws on the other coupling element.

A further object of the invention is to provide a coupling device which can be readily manipulated by robots in automated assembly plants and like establishments.

An additional object of the invention is to provide a motor vehicle which embodies the above outlined coupling device.

Still another object of the invention is to provide a cooling system for use in motor vehicles wherein tubular parts are separably but sealingly connectable to each other by the above outlined coupling device.

A further object of the invention is to provide a novel and improved method of connecting and separating the coupling elements of the above outlined coupling device.

Another object of the invention is to provide novel and improved coupling elements for use in the above outlined coupling device.

An additional object of the invention is to provide a coupling device wherein all claws on one of the coupling elements are ready to be separated from the rib on the other coupling elements when one of the claws is ready for such separation.

Another object of the invention is to provide novel and improved means for changing the orientation of coupling elements relative to each other when they are not in proper positions for attachment to each other.

The invention is embodied in a device for sealingly and separably coupling two tubular members, such as a hose and a part of a radiator in a motor vehicle. The improved device comprises a first annular coupling element on one of the tubular members and a second annular coupling element on the other tubular member. One of the coupling elements includes a first front end, an annular external rib with a conical first flank diverging outwardly from the first front end and a substantially radial second flank which faces away from the first front end, and at least one bridge which extends from the first flank of the annular rib substantially radially and axially of the rib and substantially between the first front end and the second flank. The other coupling element includes a tubular body portion having a second front end which is movable into sealing engagement with the first front end, and a plurality of deformable arms or prongs each having a rear portion rigid with the tubular body portion behind the second front end and a front portion provided with a substantially radially inwardly extending claw slidable over the first flange (with attendant outward flexing of the respective prong) and engageable with the second flange of the rib to thereby hold the second front end in sealing engagement with the first front end. The bridge and each of the front portions have complementary means for automatically turning the first coupling element relative to the second coupling element and/or vice versa in response to axial movement of the coupling elements toward each other in such angular positions that one of the front portions abuts the bridge. This ensures that each of the claws can slide along the first flank of the rib on its way toward engagement with the second flank.

The aforementioned turning means preferably comprises at least one cam face on the bridge and at least one complementary cam face on each front portion. In accordance with a presently preferred embodiment, the bridge has two mutually inclined cam faces which converge toward each other in the circumferential direction of the rib and toward the first front end, and each front portion has two mutually inclined cam faces which converge toward each other in the circumferential direction of the body portion of the other coupling element so as to impart to the respective claw a substantially wedge-shaped outline which tapers forwardly in a direction away from the rear portion of the respective prong.

The one coupling element is preferably provided with a discrete ramp for each claw; such ramps are disposed behind the second flank of the rib and each ramp has a top land in the region of the maximum diameter of the rib and a pair of concave surfaces which flank the top land. One of the ramps is aligned with the bridge, and the mutual spacing of the ramps in the circumferential direction of the one coupling element is identical with the mutual spacing of the claws in the circumferential direction of the other coupling element so that rotation of the coupling elements to move one of the claws along one of the concave surfaces and onto the respective top land results in engagement of each other claw with the top land of a ramp to thus allow for separation of the coupling elements from each other because the claws are located radially outwardly of the second flank of the rib.

The top lands can be flat, or each thereof can simply constitute a narrow (practically linear) ridge between the respective concave surfaces. The bridge can be provided with a flat which is aligned with the top land of the registering ramp so that the claw which has been caused to engage such top land can slide along the flat of the bridge during disengagement of the coupling elements from each other.

The distance between the cam faces of the bridge in the region of the second flank of the rib can exceed the width of the top land of the respective (registering) ramp between the concave surfaces of such ramp.

Each claw can comprise a flat between the respective pair of cam faces.

The body portion of the other coupling element can be integral with the rear portions of the prongs. The entire other coupling element (with the possible exception of a strongly elastic sealing ring forming part of the second front portion) can be made of a single piece of slightly elastic thermoplastic material.

At least one coupling element preferably consists of a plastic material, and at least one of the coupling elements can be integral with the respective tubular member.

In accordance with a presently preferred embodiment of the improved device, the body portion of the other coupling element includes a smaller-diameter part, an elastic sealing ring on the smaller-diameter part, and a larger-diameter part behind the smaller-diameter part. The rear portions of the prongs are rigid with the larger-diameter part, and the smaller-diameter part and the sealing ring together constitute the second front end.

The one coupling element can resemble or constitute a nipple and the respective tubular member can constitute a portion of a radiator for a motor vehicle. The nipple is integral with such portion of the radiator.

The novel features which are considered as characteristic of the invention are set forth in particular in the appended claims. The improved coupling device itself, however, both as to its construction and the mode of assembling or disengaging the same, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary perspective view of the two tubular members and a perspective view of the two coupling elements which are separated from each other and are shown in positions they assume preparatory to engagement of claws on the prongs of the other coupling element with the rib of the one coupling element.

DESCRIPTION OF THE PREFERRED EMBODIMENTS

The drawing shows a first tubular member 1 which is a flexible hose of elastomeric thermoplastic material, and a second tubular member 4 which constitutes a part of a radiator in a motor vehicle. The improved coupling device which can establish a separable fluidtight connection between the hose 1 and the part 4 comprises a first annular coupling element 2 which is sealingly secured to one end of the hose and a second annular coupling element 3 which is a nipple or nozzle forming an integral portion of the part 4. The entire coupling element 2 (save for a readily deformable sealing ring 7) is preferably made of a slightly elastic thermoplastic material whose flexibility can be much less than that of the hose 1. The nipple 3 can be made of a metallic or plastic material and need not include any elastically deformable components.

The coupling element 2 includes a tubular body portion having a smaller-diameter front part 5, a larger-diameter rear part 6 and the aforementioned sealing ring 7. The part 6 sealingly surrounds the adjacent end of the hose 1, and the part 5 and the sealing ring 7 together constitute the front end of the coupling element 2. The latter further comprises three equidistant arms or prongs 13 (only two can be seen in the drawing) each having a rear portion 15 integral with the rear part of the tubular body portion 5–7, a front portion 14 and a substantially radially inwardly extending claw 16 on the front portion 14.

The outer diameter of the part 5 of the body portion 5–7 is smaller than the inner diameter of the annular coupling element or nipple 3 so that the part 5 can be introduced into the front end 30 of the nipple in order to move the sealing ring 7 into requisite sealing engagement with the external surface of the part 5 as well as with the internal surface of the front end 30. The outer diameter of the rear part 6 of the tubular body portion 5–7 of the coupling element 2 is preferably selected in such a way that it can barely fit into the front end 30 of the nipple 3. For example, the external surface of the part 6 can be moved into slight frictional engagement with the internal surface of the nipple 3 when the front ends 30 and 5, 7 cooperate to establish a reliable fluid-tight seal between the two coupling elements.

The illustrated end portion of the hose 1 extends into the tubular body portion 5–7 of the coupling element 2 all the way to an internal shoulder (not shown) between the parts 5 and 6. The inner diameter of the part 6 is selected in such a way that the end of the hose 1 must undergo at least some radial deformation in order to fit into the coupling element 2. Moreover, and in order to further reduce the likelihood of leakage of fluid between the tubular body portion 5–7 of the coupling element 2 and the hose 1, the end of the hose is preferably integrally connected to the body portion 5–7. For example, the materials of the end of the hose 1 and of the part 6 can be heated to fusion temperature so that they can be readily fused together and, after setting, the thus established connection can stand all anticipated tensional and/or other stresses while simultaneously ensuring the establishment of a leakproof seal between 1 and 6. The fusing of the materials of the tubular body portion 5–7 and the end of the hose 1 can also take place along the aforementioned internal shoulder between the parts 5 and 6 to even further enhance the sealing and retaining action.

Instead of heating the part 6 and the end of the hose 1 to fusion temperature, it is also possible to employ a suitable adhesive which establishes a reliable fluidtight and tension-resistant bond between the part 6 and the hose 1. For example, if the end of the hose 1 is made of rubber, one can employ a heat-activatable adhesive which is activated in response to heating during vulcanizing of the rubber. Such vulcanizing takes place subsequent to application of the heat-activatable adhesive and subsequent to introduction of the end of the hose into the part 6 of the tubular body portion 5–7 of the coupling element 2. During vulcanizing, the end of the hose 1 is heated to a temperature which suffices to ensure the establishment of a reliable bond between the hose and the coupling element 2.

The rear portions 15 of the three arms or prongs 13 are integral with a ring-shaped flange 12 which, in turn, is integral with the part 6 of the tubular body portion 5–7 of the coupling element 2. Each prong 13 tapers forwardly in a direction from its rear portion 15 toward its front portion 14 which latter carries the respective radially inwardly extending claw 16. The arrangement is preferably such that each rear portion 15 establishes a gradual arcuate connection between the flange 12 and the forwardly narrowing or tapering median portion of the respective prong 13; such median portions are substantially parallel to the axis of the coupling element 2. As can be seen in the drawing, the configuration of the prongs 13 is preferably such that their dimensions decrease in a direction from the respective rear portions 15 toward the respective front portions 14 in the circumferential direction as well as radially of the tubular body portion 5–7. This enhances the flexibility of the prongs 13 and enables the claws 16 to move radially outwardly during attachment of the coupling element 2 to the nipple 3.

Each claw 16 has two mutually inclined cam faces 17 at opposite sides of a top land 20 in the form of a flat. The cam faces 17 taper toward each other in a forward direction, i.e., away from the flange 12 and their foremost portions can merge gradually into the respective flat 20. Each claw 16 further includes a facet 18 which faces rearwardly (toward the flange 12) and can come into engagement with a radially extending second or rear flank 31 of a circumferentially complete annular external rib 21 on the nipple 3. As additional facet 19 on each claw 16 is disposed between the respective flat 20 and the respective facet 18. The purpose of the flats 20 is to facilitate outward flexing of the respective prongs 13 during attachment of the coupling element 2 of the nipple 3; at such time, the flats 20 slide along the conical front or first flank 22 of the annular rib 21 on the nipple 3.

The conical front flank 22 is disposed between the front end 30 of the nipple 3 and the second or rear flank 31 and tapers outwardly in a direction away from the front end 30 so that the maximum-diameter portion of the rib 21 is located in the region where the radially outermost portion of the conical flank 22 meets the radially outermost portion of the radial flank 31. The inclination of the front flank 22 of the rib 21 with reference to the axis of the nipple 3 can be in the range of 30°.

The nipple 3 is further formed with a composite annular groove 24 which is adjacent and is located behind the radially extending flank 31 (i.e., the rib 21 is located between the recess 24 and the front end 30). This groove is interrupted by three axially parallel ramps 23 each of which has a flat top land 26 at a radial distance from the axis of the nipple 3 which matches or approximates the radius of the maximum-diameter portion of the rib 21. The mutual spacing of top lands 26 on the three ramps 23 (only two ramps can be seen in the perspective view of drawing) in the circumferential direction of the nipple 3 is the same as that of the claws 16 (in the circumferential direction of the coupling element 2). Each ramp 23 further comprises two concave surfaces 25 which flank the respective top land 26 and serve to direct the claws 16 toward and onto the respective top lands when the claws 16 are received in the groove 24 in the nipple 3 is turned relative to the coupling element 2 and/or vice versa (as a rule, the coupling element 2 will be turned relative to the nipple 3, and this can entail some twisting of the elastically deformable hose 1).

The top land 26 of one of the ramps 23 is in register with the top land or flat 29 of a bridge 27 which projects from the conical front flank 22 of the rib 21 and has two mutually inclined cam faces 28 which are complementary to the cam faces 17 on the claws 16. The cam faces 28 converge or taper toward each other in the circumferential direction of the nipple 3 and from the rear flank 31 toward the front end 30. As can be readily seen in the drawing, the distance between the cam faces 28 in the region of the flank 31 exceeds the width of the flat top land 26 on the aligned ramp 23. The foremost part of the bridge 27 is preferably rounded, i.e., there is a gradual and smooth transition between the foremost portions of the cam faces 28 to promote a turning of the coupling element 2 relative to the nipple 3 if an operator or a robot happens to advance the front end 5, 7 of the coupling element 2 toward the nipple 3 in such orientation of the coupling element 2 that one of the claws 16 strikes the bridge 27. The foremost parts of the claws 16 are preferably rounded so as to facilitate the required turning of the coupling element 2 relative to the nipple 3 if the orientation of the coupling element 2 during attachment to the nipple 3 is such that one of the claws 16 hits the bridge 27. However, it is equally within the purview of the invention to design the bridge 27 in such a way that the front portions of the cam faces 28 define a relatively sharp ridge which extends radially of the nipple 3. Analogously, the cam faces 17 on the claws 16 of the prongs 13 can also define reasonably sharp ridges which extend radially of the coupling element 2.

The hose 1 can be attached to the radiator part 4 in the following way:

The coupling element 2 is grasped by hand or by a robot and is moved to a position in which its axis coincides (at least substantially) with the axis of the nipple 3. The front end 5, 7 of the coupling element 2 is then introduced into the front end 30 of the nipple 3 whereby the flats 20 of the claws 16 slide along the conical front flank 22 of the rib 21 with attendant flexing of the median portions of the respective prongs 13. The prongs 13 are at least slightly elastic so that they can yield in response to movement of the claws 16 along the front flank 22 toward the maximum-diameter portion of the rib 21. The claws 16 snap radially inwardly as soon as their facets 18 advance beyond the radial rear flank 31 of the rib 21, i.e., as soon as the claws 16 are free to enter the groove 24 of the nipple 3. At such time, the elastically deformable sealing ring 7 is clamped between the internal surface of the nipple 3 and the peripheral surface of the part 5 of the tubular body portion 5–7 of the coupling element 2 so that the two coupling elements are in sealing engagement with one another.

If one of the claws 16 happens to be in line with the bridge 27 when the coupling element 2 is moved axially toward the nipple 3, one of the cam faces 17 on such claw 16 automatically slides along one cam face 28 of the bridge 27 with the result that the angular position of the coupling element 2 relative to the nipple 3 is changed to an extent which is necessary to ensure that each claw 16 of the thus turned or reoriented coupling element 2 can slide along the conical front flank 22 of the rib 21 in response to further axial movement of the coupling element 2 toward the rear flank 31 and groove 24. As mentioned above, the material of the hose 1 is or can be sufficiently elastic to allow for some twisting of the hose in response to a change in the angular position of the coupling element 2 relative to the nipple upon engagement of one of the claws 16 with the bridge 27. Of course, no twisting of the hose 1 is necessary if the other end of the hose is not connected to a non-rotatable part.

It will be noted that a change in angular position of the coupling element 2 relative to the nipple 3 takes place automatically as soon as one of the claws 16 strikes the bridge 27, i.e., all an operator or a robot has to do is to continue to exert a force in the axial direction of the nipple 3 whereby the coupling element 2 turns because one of the cam faces 17 on the claw 16 which has struck the bridge 27 slides along one of the cam faces 28 on the bridge.

In order to disengage the coupling element 2 from the nipple 3, an operator or a robot must turn the coupling element 2 relative to the rib 21 so that the facets 19 of all three claws 16 advance toward and slide radially outwardly along the nearest concave surfaces 25 which steer the claws onto the respective top lands 26, i.e., the claws are expelled from the groove 24 and are free to move axially of the nipple 3 and away from the groove 24. At such time, one of the claws 16 slides along the flat 29 of the bridge 27 while the other two claws 16 simply move radially inwardly and track the conical front flank 22 in a direction from the radial rear flank 31 toward the front end 30 of the nipple 3.

The purpose of the bridge 27 is to ensure that each claw 16 invariably enters the groove 24 (rather than remaining in engagement with the top land 26 of a ramp 23) when the coupling element 2 has been advanced toward the part 4 to an extent such that the facets 18 of the claws 16 are located to the left of the radial flank 31 (as seen in the drawing). In the absence of the bridge 27 and of its cam faces 28, an operator or a robot could accidentally advance the coupling element 2 toward the part 4 in such angular position that each of the claws 16 would come into and remain in engagement with the top land 26 of the respective ramp 23. This is not possible in the improved coupling device because the bridge 27 automatically compels the coupling element 2 to change its angular position if its claws 16 happen to be aligned with the ramps 23 during attachment of the coupling element 2 to the nipple 3.

The width of each top land 26 (in the circumferential direction of the nipple 3) can be reduced to a small fraction of the illustrated width or practically to zero, i.e., the concave surfaces 25 of each ramp 23 can define a rather sharp edge in the region of the radially outermost portion of the rib 21 and one of these ridges registers with the flat 29 of the bridge 27. Alternatively, the pronounced flat top lands 26 can be replaced with rounded ridges resembling those defined by the foremost portions of cam faces 28 on the bridge 27.

It is further possible to impart to each claw 16 a pronounced wedge-like configuration with a sharp edge at its foremost end. Moreover, the cam faces 17 on each claw 16 can taper toward each other radially inwardly toward the axis of the coupling element 2 so that the width of each facet 18 (in the circumferential direction of the coupling element 2) is reduced to a fraction of the illustrated width. Still further, the maximum distance between the cam faces 28 of the bridge 27 (in the region of the radial flank 31 of the rib 21) need not exceed the width of the respective top land 26 (in the circumferential direction of the nipple 3). The provision of a bridge 27 whose width increases in a direction from the front end 30 toward the rear flank 31 (so that the maximum distance between the cam faces 28 in the region of the flank 31 appreciably or greatly exceeds the width of a top land 26) is preferred at this time because this ensures that the angular displacement of the coupling element 2 relative to the nipple 3 (in the event that one of the claws 16 has struck the bridge 27) suffices to enable each claw 16 to enter the deepmost or a relatively deep portion of the groove 24 rather than a groove portion which is disposed radially outwardly of a concave surface 25.

The number of bridges 27 can be increased to two or more; for example, each ramp 23 can be disposed behind a discrete bridge.

It is further within the purview of the invention to provide a separable connection between the nipple 3 and the part 4 and/or to provide a separable connection between the hose 1 and the coupling element 2. For example, the end of the hose 1 can be simply stuffed into the part 6 of the tubular body portion 5-7 of the coupling element 2 so as to establish a reliable frictional engagement which suffices to prevent accidental separation of the coupling element 2 from the hose 1 as well as to establish a fluidtight seal between 1 and 2. Alternatively, and if the improved coupling device is to be used under circumstances when the connection between the hose 1 and the coupling element 2 must stand pronounced axial separating stresses but it is not desirable or practical to permanently bond the hose to the coupling element 2, the connection between these parts can be similar to that which is disclosed in commonly owned U.S. Pat. No. 4,708,375. Furthermore, the connection which is disclosed in the Offenlegungsschrift can be used in addition to the aforediscussed permanent connection between the end of the hose 1 and the coupling element 2 so as to ensure that the connection will be capable of withstanding pronounced or extremely high tensional stresses.

The concave surfaces 25 of the ramps 23 can be replaced with flat or even slightly convex surfaces without departing from the spirit of the invention. Concave surfaces 25 are preferred at this time because they reduce the likelihood of jamming of the claws 16 in the groove 24 and render it possible to move the claws 16 radially outwardly onto the top lands 26 with a minimum of effort. Furthermore, the top lands 26 of the ramps 23 can be located radially outwardly of the maximum-diameter portion of the rib 21. Flat top lands 26 are preferred because they ensure that each of the claws 16 can come to rest thereon in several angular positions of the coupling element 2 relative to the nipple 3 even if the width of the facets 19 in the circumferential direction of the coupling element 2 is minimal. Alternatively, the flat top lands 26 can be replaced with very narrow or practically linear ridges if the facets 19 of the claws 16 are relatively wide. This merely amounts to a reversal of functions. Still further, it is possible to provide each claw 16 with a relatively wide facet 19 and to provide each ramp 23 with a relatively wide top land 26. This facilitates the movement of the coupling element 2 to an angular position in which the claws 16 are held radially outwardly of the rib 21 and the coupling element 2 is ready to be detached from the nipple 3.

The prongs 13 can constitute separately produced parts which are welded or otherwise securely affixed to the tubular body portion 5-7 of the coupling element 2. The making of a one-piece coupling element 2 from a suitable slightly elastic plastic material is preferred because this contributes to lower cost of the coupling device. If the one or the other coupling element is made of a plastic material, it can be mass produced in an injection molding or other suitable machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for sealingly and separably coupling two tubular members, comprising a first annular coupling element on one of the tubular members and a second annular coupling element on the other of the tubular members, one of said coupling elements including a first front end, an annular external rib with a conical first flank diverging outwardly from said front end and a substantially radial second flank facing away from said front end, said one coupling element further including at least one bridge extending from said first flank substantially radially and axially of said rib between said front end and said second flank, the other of said coupling elements including a tubular body portion having a second front end movable into sealing engagement with said one coupling element in the general region of said first front end and a plurality of deformable prongs each having a rear portion rigid with said body portion behind said second front end and a front portion provided with a substantially radially inwardly extending claw slidable over said first flange, with attendant outward flexing of the respective prong, and engageable with said second flange to thereby hold said second front end in sealing engagement with said first front end, said bridge and each of said front portions having complementary means for turning said first coupling element relative to said second coupling element in response to axial movement of said coupling elements toward each other when in such angular positions that one of said front portions abuts said bridge.

2. The device of claim 1, wherein said turning means comprises at least one cam face on said bridge and at least one cam face on each of said front portions.

3. The device of claim 2, wherein said bridge has two mutually inclined cam faces which converge toward each other in the circumferential direction of said rib and toward said first front end, each of said front portions having two mutually inclined cam faces which converge toward each other in the circumferential direction of said body portion so as to impart to the respective claw a substantially wedge-shaped outline tapering forwardly in a direction away from the rear portion of the respective arm.

4. The device of claim 3, wherein each of said claws has a flat between the respective pair of cam faces.

5. The device of claim 3, wherein said one coupling element has a discrete ramp for each of said claws, said ramps being disposed behind said second flank and each thereof having a top land in the region of the maximum diameter of said rib and a pair of concave surfaces flanking the top land, one of said ramps being aligned with said bridge and the mutual spacing of said ramps in the circumferential direction of said one coupling element being identical with the mutual spacing of said claws in the circumferential direction of said other coupling element so that rotation of said coupling elements relative to each other so as to move one of said claws along one of said concave surfaces and onto the respective top land results in engagement of each other claw with the top land of one of said ramps to allow for separation of the coupling elements from each other.

6. The device of claim 5, wherein said top lands are flat.

7. The device of claim 5, wherein said bridge has a flat in substantial alignment with the top land of the registering ramp.

8. The device of claim 5, wherein the distance between the cam faces of said bridge in the region of said second flank exceeds the width of the respective top land between the concave surfaces of such ramp.

9. The device of claim 1, wherein said body portion is integral with said prongs.

10. The device of claim 9, wherein said body portion and said prongs consist of slightly elastic thermoplastic material.

11. The device of claim 1, wherein at least one of said coupling elements consists of plastic material.

12. The device of claim 1, wherein at least one of said coupling elements is integral with the respective tubular member.

13. The device of claim 1, wherein said body portion includes a smaller-diameter part, an elastic sealing ring on said smaller-diameter part, and a larger-diameter part behind said smaller-diameter part, the rear portions of said prongs being rigid with said larger-diameter part and said smaller-diameter part and said sealing ring together constituting said second front end.

14. The device of claim 1, wherein said one coupling element includes a nipple and the respective tubular member constitutes a portion of a radiator for a motor vehicle.

* * * * *